(12) United States Patent
Lin

(10) Patent No.: US 8,312,912 B2
(45) Date of Patent: Nov. 20, 2012

(54) SUNSHADE ASSEMBLY HAVING A CLUTCH UNIT

(75) Inventor: Paul Lin, Tainan (TW)

(73) Assignee: Macauto Industrial Co., Ltd., Tainan (TW)

( * ) Notice: Subject to any disclaimer, the term of this patent is extended or adjusted under 35 U.S.C. 154(b) by 19 days.

(21) Appl. No.: 13/100,372

(22) Filed: May 4, 2011

(65) Prior Publication Data

US 2011/0272105 A1    Nov. 10, 2011

(30) Foreign Application Priority Data

May 6, 2010   (TW) ............................... 99114509 A

(51) Int. Cl.
*B60J 3/00*    (2006.01)

(52) U.S. Cl. ................ 160/370.22; 160/265; 160/304.1

(58) Field of Classification Search ............. 160/370.22, 160/265, 302, 300, 301, 303, 304.1; 296/97.8
See application file for complete search history.

(56) References Cited

U.S. PATENT DOCUMENTS

| 5,443,300 | A | * | 8/1995 | Mohammed | 296/97.4 |
|---|---|---|---|---|---|
| 5,746,469 | A | * | 5/1998 | Nonaka | 296/97.7 |
| 2008/0017335 | A1 | * | 1/2008 | Pohl et al. | 160/370.22 |
| 2008/0216972 | A1 | * | 9/2008 | Starzmann et al. | 160/310 |
| 2008/0223531 | A1 | * | 9/2008 | Lekar et al. | 160/265 |
| 2008/0230190 | A1 | * | 9/2008 | Hansen | 160/265 |
| 2009/0020236 | A1 | * | 1/2009 | Hansen | 160/275 |
| 2009/0078379 | A1 | * | 3/2009 | Hansen | 160/265 |

* cited by examiner

*Primary Examiner* — David Purol
(74) *Attorney, Agent, or Firm* — Whyte Hirschboeck Dudek SC

(57) ABSTRACT

A sunshade assembly includes a housing having a top opening, a winding shaft mounted rotatably in the housing, a sunshade cloth wound around the winding shaft, a pull rod disposed outside the top opening, a frame body disposed below the housing, a gear rack mounted to the frame body and having a top end connected to the pull rod, and a clutch unit meshing with the gear rack and including a pusher that is operable to place the clutch unit in a non-clutching position, where the gear rack is freely movable to permit the sunshade cloth to be wound by the winding shaft, or a clutching position, where the clutch unit applies a retarding force to retard a movement of the gear rack, which prevents the winding shaft from winding the sunshade cloth but permits the pull rod to pull and stop the sunshade cloth at a desired position.

6 Claims, 8 Drawing Sheets

SUNSHADE ASSEMBLY HAVING A CLUTCH UNIT

CROSS-REFERENCE TO RELATED APPLICATION

This application claims priority of Taiwanese application No. 099114509, filed on May 6, 2010.

BACKGROUND OF THE INVENTION

1. Field of the Invention

The invention relates to a sunshade assembly, and more particularly to a sunshade assembly that is adapted to be installed on a side window of a vehicle.

2. Description of the Related Art

To prevent sunlight from directly radiating into an interior of a vehicle, a layer of insulating film may be adhered to the window of a conventional vehicle. Some vehicle owners further install a sunshade assembly on the side window to further shade the interior of the vehicle from sunlight. Hence, a variety of sunshade assemblies have been developed and sold in the market. Some are motor-operated sunshade assemblies, and others are manually-operated sunshade assemblies. Some include a combination of motor- and manually-operated sunshade assemblies. The unwinding operation may be performed manually, while the winding operation may be performed automatically.

In the conventional sunshade assembly, the sunshade cloth may be configured to be completely retracted or extended. When the sunshade cloth is completely extended, it can negatively affect the air circulation inside the vehicle. Further, a shading area of the sunshade cloth may be non-adjustable.

SUMMARY OF THE INVENTION

Therefore, an object of the present invention is to provide a sunshade assembly having a sunshade cloth with an adjustable shading area that may be stopped at any desired position.

According to this invention, a sunshade assembly comprises a housing having a top opening, a winding shaft mounted rotatably in the housing, a sunshade cloth wound around the winding shaft, a pull rod connected to one end of the sunshade cloth that is distal from the winding shaft and disposed outside the top opening, a frame body disposed below the housing and extending in a top-bottom direction, a gear rack mounted to the frame body to move upward or downward and having a top end connected to the pull rod, and a clutch unit mounted to the frame body and meshing with the gear rack. The clutch unit includes a pusher mounted movably to the frame body, and a return spring disposed on the frame body to return the pusher. The pusher is operable to place the clutch unit in a clutching or non-clutching position. When the clutch unit is in the non-clutching position, the gear rack is freely movable to permit the sunshade cloth to be wound by the winding shaft. When the clutch unit is in the clutching position, the clutch unit applies a retarding force to retard a movement of the gear rack, which prevents the winding shaft from winding the sunshade cloth but permits the pull rod to pull and stop the sunshade cloth at a desired position.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
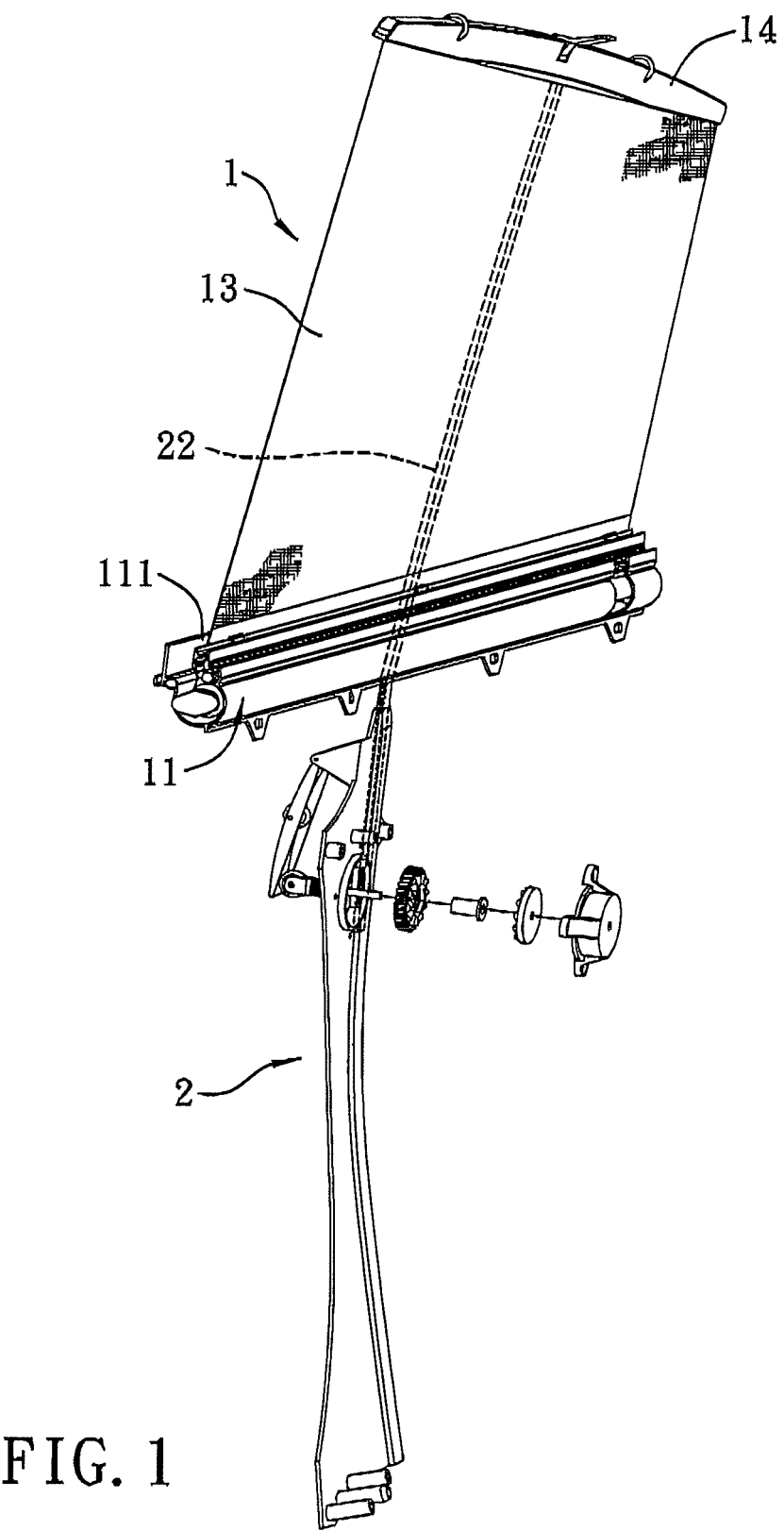
FIG. 1 is a partially exploded perspective view of a sunshade assembly according to the preferred embodiment of the present invention.
Figure 2:
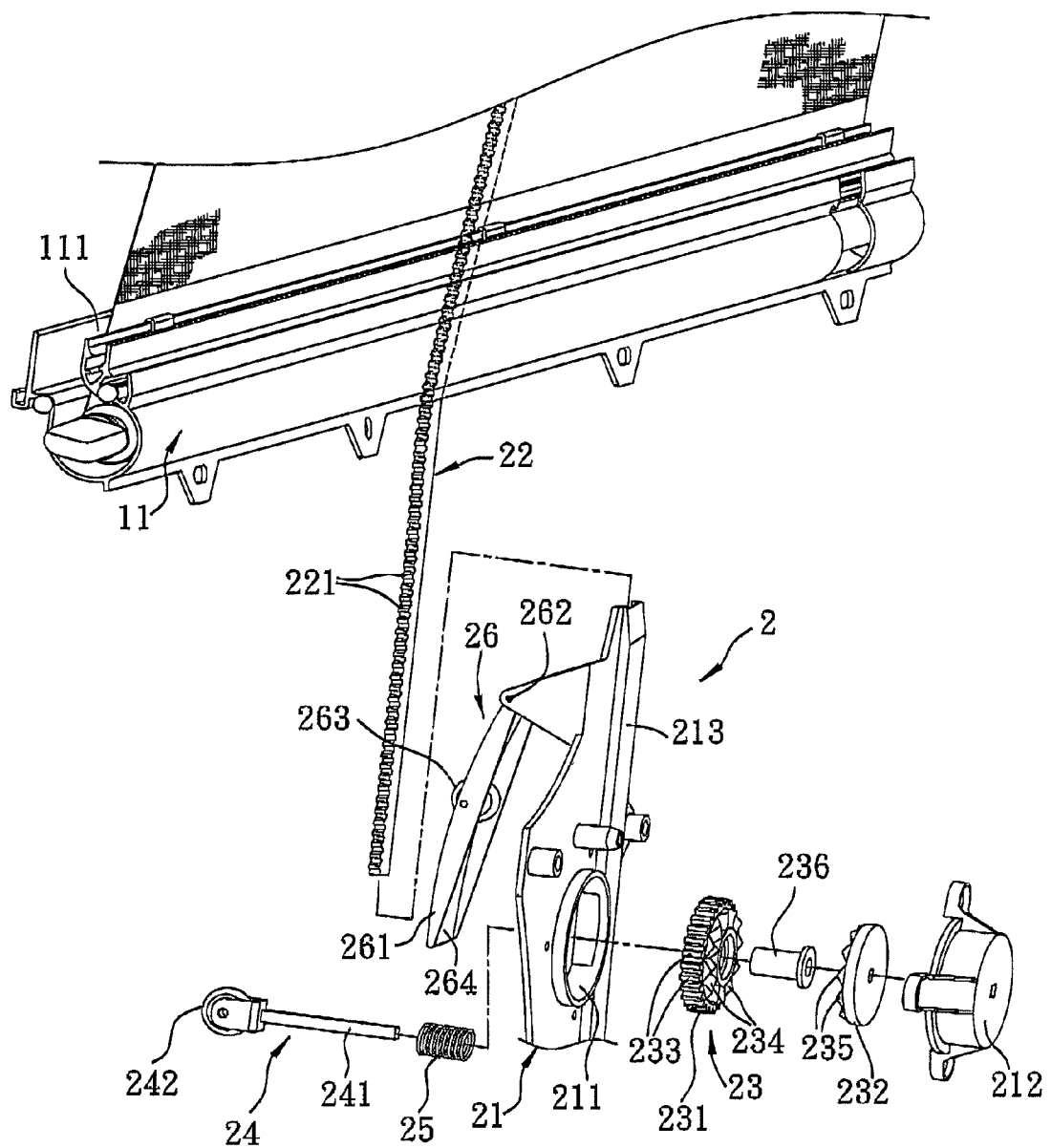
FIG. 2 is a fragmentary exploded perspective view of a limiting mechanism of the preferred embodiment.

Referring to FIGS. 1 to 8, a sunshade assembly according to the preferred embodiment of the present invention is shown to comprise a sunshade mechanism 1 and a limiting mechanism 2. The sunshade assembly of the present invention is adapted to be installed on a door (not shown) of a vehicle, and corresponds in position to one side of a side window (see FIG. 3).

The sunshade mechanism 1 includes a housing 11 having a top opening 111, a rewindable winding shaft 12 mounted rotatably in the housing 11, a sunshade cloth 13 extendably wound around the winding shaft 12, and a pull rod 14 connected to one end of the sunshade cloth 13 distal from the winding shaft 12 and disposed outside the top opening 111. The sunshade mechanism 1 may further include at least one torsion spring (not shown) having one end that is fixed, and another end connected to the winding shaft 12. The torsion spring is rotatable along with the winding shaft 12 to provide a winding biasing force to the winding shaft 12 along a winding direction. In the absence of an external force, the sunshade cloth 13 may be automatically wound into the housing 11 by the winding shaft 12. The sunshade mechanism may have other constructions.

The limiting mechanism 2 includes a frame body 21 disposed below the housing 11 and extending in a top-bottom direction, a gear rack 22 mounted to and movable upward or downward on the frame body 21 and having a top end connected to the pull rod 14 (see FIG. 1), a clutch unit 23 mounted to the frame body 21 and meshing with the gear rack 22, and a swing unit 26 mounted pivotally on the frame body 21. The frame body 21 is disposed on a bottom side of the housing 211 that is distal from the top opening 111, and includes a circular receiving portion 211 with an open side, a cover portion 212 to cover the open side of the receiving portion 211, and a guide rail portion 213 extending in a top-bottom direction and communicating spatially with the receiving portion 211. The gear rack 22 is disposed in and movable upward or downward on the guide rail portion 213, and has a plurality of spaced-apart rack teeth 221 arranged in the top-bottom direction and facing the clutch unit 23.

The clutch unit 23 includes a first ratchet wheel 231 mounted rotatably on the frame body 21 within the receiving portion 211 and meshing with the gear rack 22, a second ratchet wheel 232 mounted coaxially with the first ratchet wheel 231 and disposed movably between the first ratchet wheel 231 and the cover portion 212, a pusher 24 mounted movably to the frame body 21, and a return spring 25 mounted between the pusher 24 and the frame body 21 to provide the pusher 24 with a return force. The first ratchet wheel 231 has a plurality of circumferentially spaced-apart axial gear teeth 233 to mesh with the rack teeth 221, and a plurality of angularly spaced-apart first radial ratchet teeth 234 formed on a radial surface of the first ratchet wheel 231 that faces the second ratchet wheel 232. The second ratchet wheel 232 has a plurality of angularly spaced-apart second radial ratchet teeth 235 formed on a radial surface of the second ratchet wheel 232 that faces the first ratchet wheel 231.

The pusher 24 has a push rod 291 inserted movably into the frame body 21 to act as a journal for the first and second ratchet wheels 231, 232, and a push rod roller 242 disposed rotatably at one end of the push rod 291 that is distal from the ratchet wheels 231, 232. A tubular sleeve 236 is sleeved around the push rod 241, and is disposed between the push rod 241 and the first ratchet wheel 231. The push rod 241 has a non-circular cross section, extends through the center of the first ratchet wheel 231 through the tubular sleeve 236, and is connected fixedly to the second ratchet wheel 232. Through this configuration, the first ratchet wheel 231 is rotatable about the push rod 241 in a clockwise or counterclockwise direction relative to the second ratchet wheel 232, and the second ratchet wheel 232 is movable axially toward or away from the first ratchet wheel 231 by the push rod 241. The second radial ratchet teeth 235 mesh with the first radial ratchet teeth 234 when the second ratchet wheel 232 is moved toward the first ratchet wheel 231.

The return spring 25 is a compression spring, and biases the pusher 24 to move in the direction of the side window 3. The return spring 25 has one end sleeved around the tubular sleeve 236 and abutting against the frame body 21, and another end sleeved around the push rod 241 and abutting against the push rod roller 242.

Figure 3:
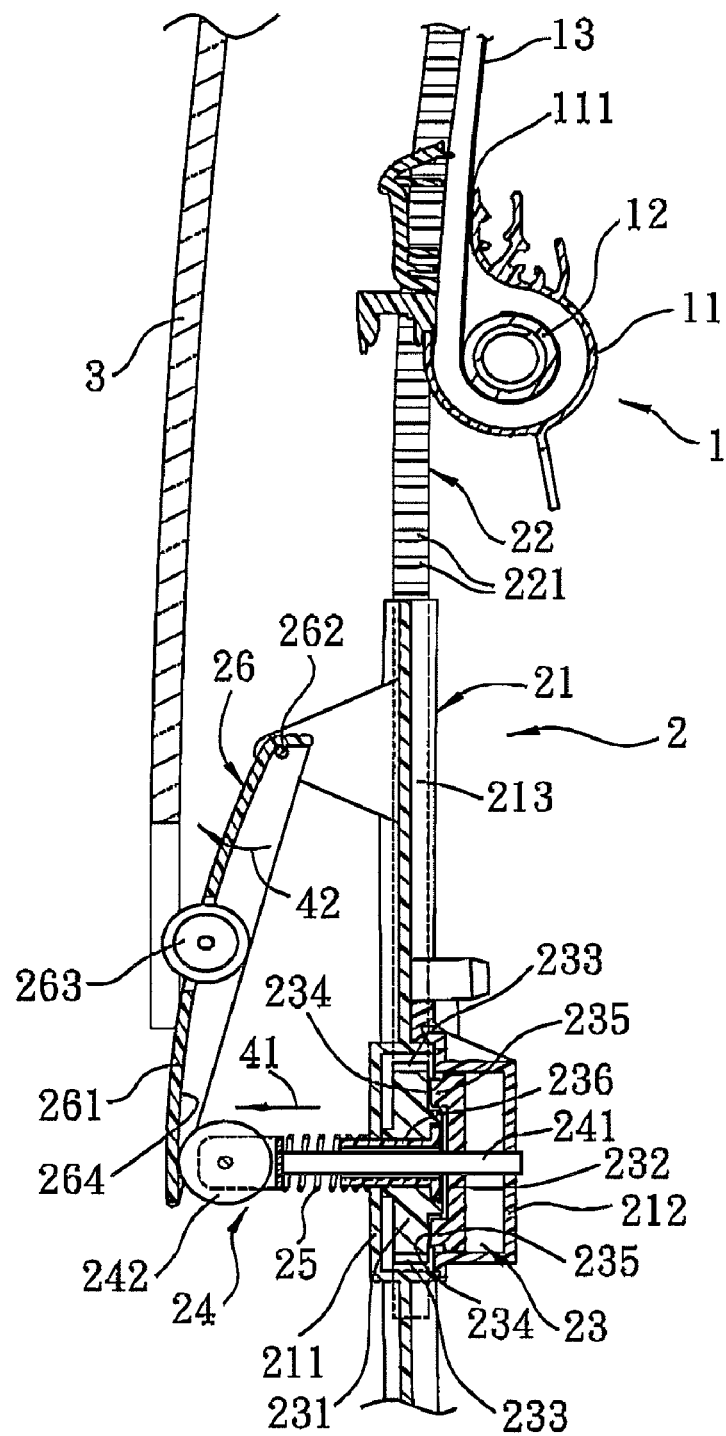
FIG. 3 is a fragmentary sectional view of the preferred embodiment, illustrating a clutch unit at a clutching position.
Figure 4:
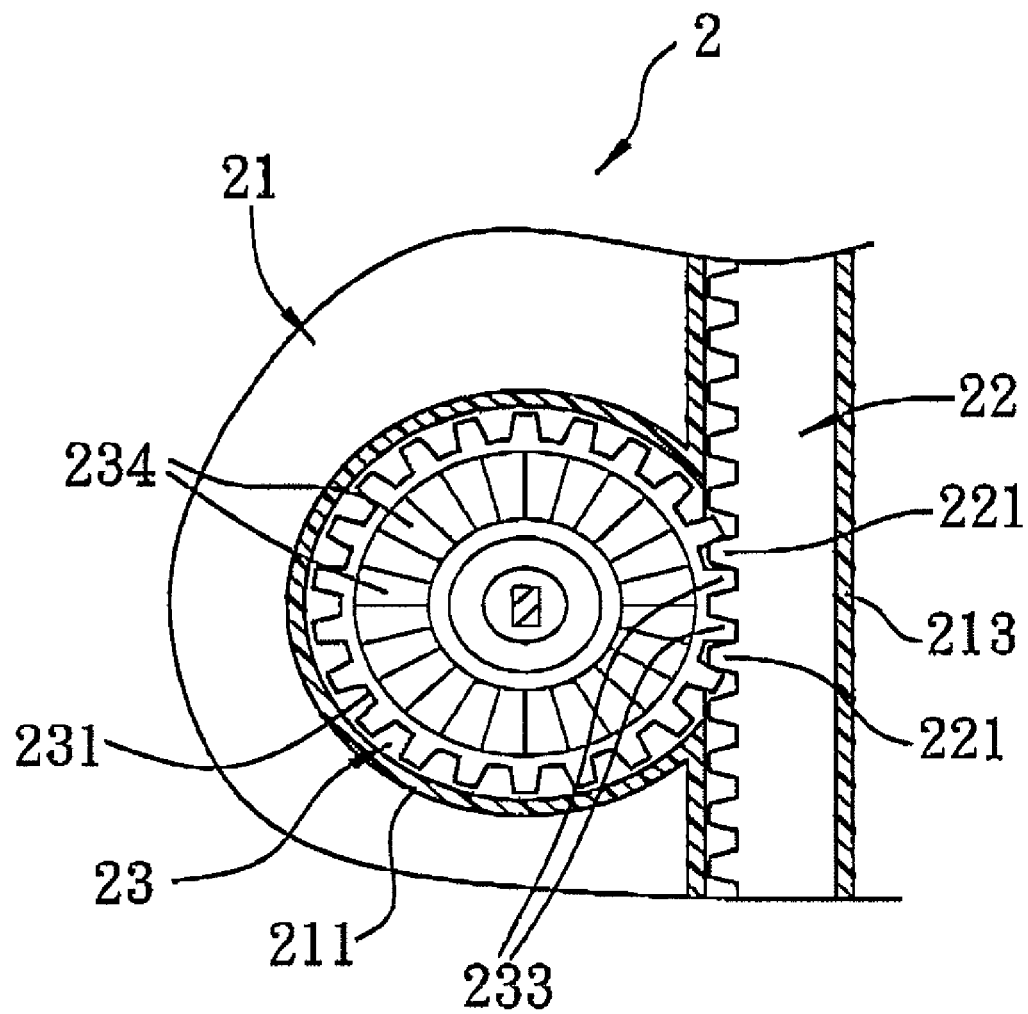
FIG. 4 is a fragmentary enlarged sectional view of the limiting mechanism of the preferred embodiment, illustrating a gear rack meshing with a first ratchet wheel.
Figure 5:
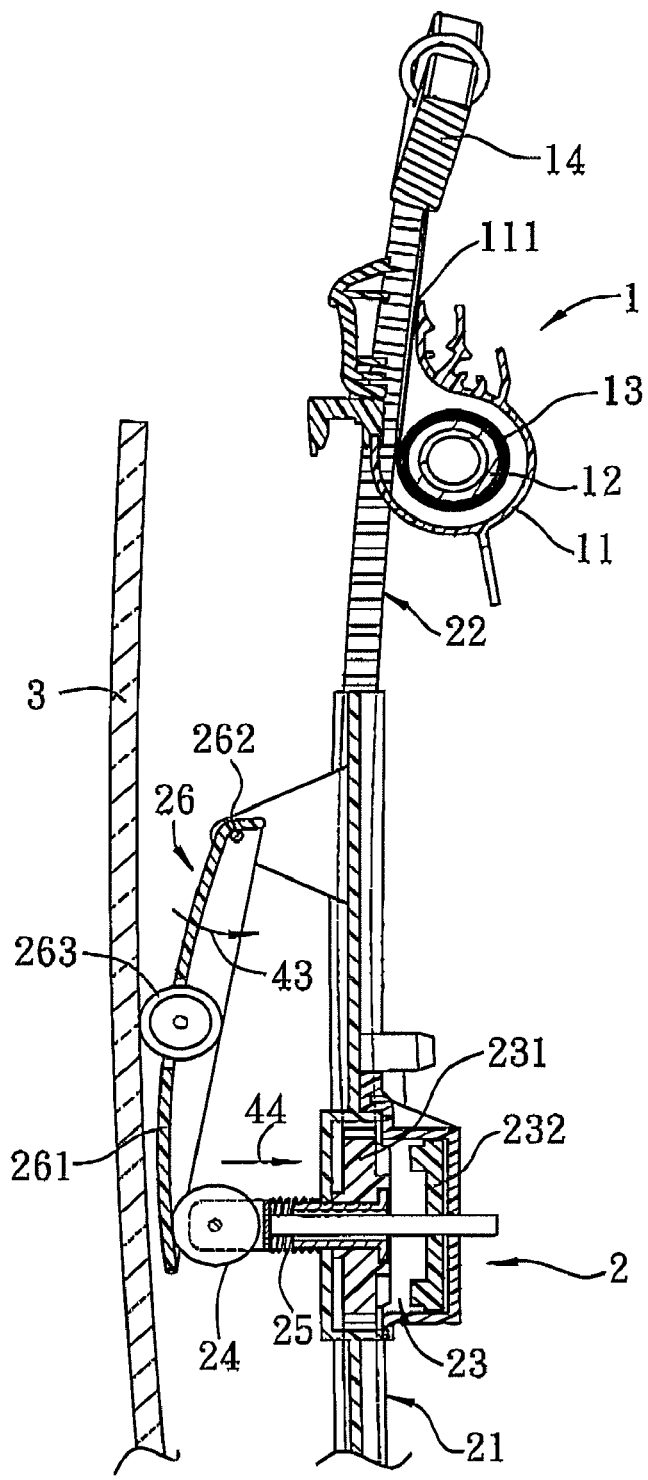
FIG. 5 is a view similar to FIG. 3, but illustrating the clutch unit at a non-clutching position.

The swing unit 26 has a swing arm 261 mounted pivotally on the frame body 21 in proximity to the side window 3, a pivot pin 262 for connecting pivotally the swing arm 261 to the frame body 21, and a swing arm roller 263 mounted rotatably on the swing arm 261. The swing arm 261 has a curved surface 264 facing the frame body 21. The push rod roller 242 is in rollable contact with the curved surface 264. Through this configuration, the swing unit 26 can operate the pusher 24 to place the clutch unit 23 in a clutching position, as shown in FIG. 3, or a non-clutching position, as shown in FIG. 5. In the clutching position, the second ratchet wheel 232 is moved toward the first ratchet wheel 231 by the push rod 241 so that the second radial ratchet teeth 235 mesh with the first radial ratchet teeth 234 to apply a retarding force to retard a movement of the gear rack 22. Thus, the winding shaft 12 is prevented from winding the sunshade cloth 13, but the pull rod 14 is permitted to pull and stop the sunshade cloth 13 at any desired position.

With reference to FIG. 5, when the swing unit 26 is actuated to swing in the direction 43, the swing arm 261 pushes the pusher 24 to move axially in the direction 49, which in turn, pushes the second ratchet wheel 232 to move axially away from the first ratchet wheel 231, thereby shifting the clutch unit 23 to the non-clutching position. At this time, because the second ratchet wheel 232 is disengaged from the first ratchet wheel 231, the gear rack 22 is freely movable to permit the sunshade cloth 13 to be wound by the winding shaft 12, and the first ratchet wheel 231 can rotate along with the movement of the gear rack 22.

The present invention can release or maintain a selected position according to the closing and opening of the side window 3, respectively, and can have the following operational modes:

First Operational Mode

Figure 6:
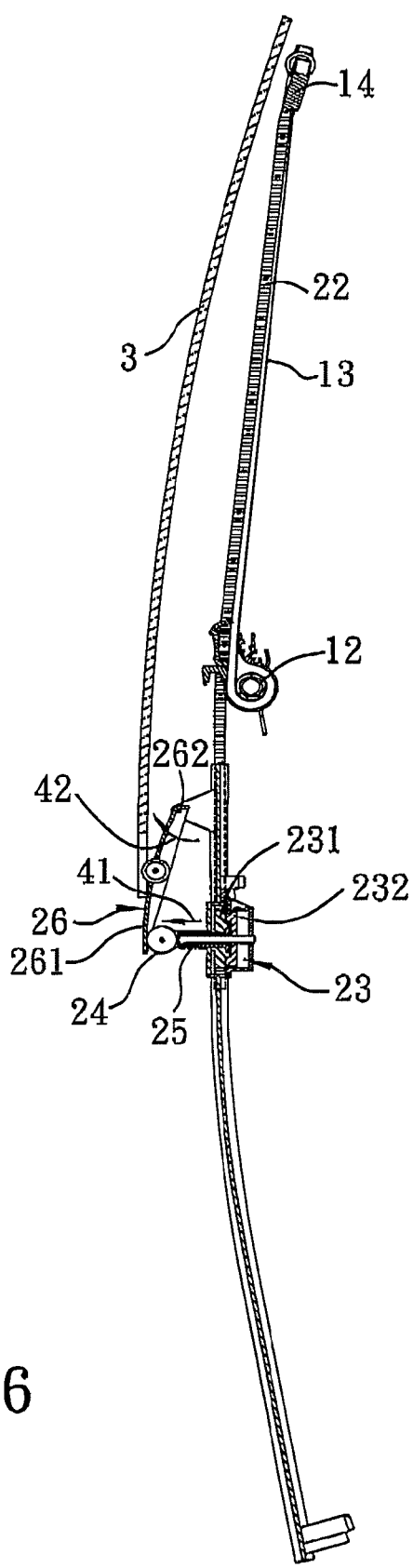
FIG. 6 is a sectional view of the preferred embodiment, illustrating how a sunshade cloth is stretched when a side window is moved upward to a closed position.

With reference to FIGS. 3 and 6, when the side window 3 is moved upward to a closed state, the sunshade cloth 13 can be selectively disposed at a stretched position. Because the side window 3 is located above the swing unit 26, the swing unit 26 receives no external force, and through a return force of the return spring 25, the pusher 24 is moved in the direction 41 toward the side window 3, and simultaneously pushes the swing arm 261 so that the swing arm 261 pivots about the pivot pin 262 in the direction 42. At this time, the clutch unit 23 is in the clutching position.

To dispose the sunshade cloth 13 at the stretched position, the pull rod 14 may be pulled upward by a user to unwind the sunshade cloth 13 from the winding shaft 12. The gear rack 22 is pulled upward along with the pull rod 14, and overcomes the resistance from a meshing force between the first and second ratchet wheels 231, 232. When the sunshade cloth 13 is moved to a desired position, and the pull rod 14 is released by the user, although the torsion spring (not shown) will exert a force to wind the sunshade cloth 13 onto the winding shaft 12, the return force of the torsion spring is opposed by the meshing force between the first ratchet wheel 231 and the gear rack 22 and between the first and second ratchet wheels 231, 232. Because the return force of the torsion spring is smaller than the meshing force, the sunshade cloth 13 can be maintained at the desired stretched position. The sunshade cloth 13 can be maintained by the meshing force at any position as desired. If it is desired to move the sunshade cloth 13 slightly downward, the user may exert a downward force on the pull rod 14 to overcome the resistance of the clutch unit 12 and to cooperate with the return force of the torsion spring to wind the sunshade cloth 13 onto the winding shaft 12. When the pull rod 19 is stopped, the sunshade cloth 13 is also stopped. Through this configuration, the shading area of the sunshade cloth 13 can be adjusted accordingly.

Second Operational Mode

Figure 7:
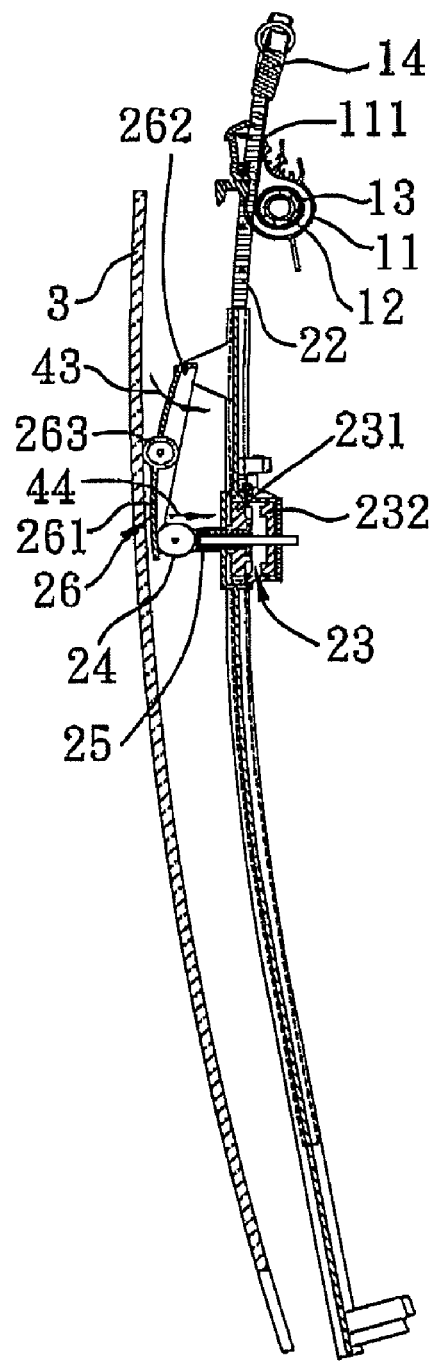
FIG. 7 is a view similar to FIG. 6, but illustrating how the sunshade cloth is wound when the side window is moved downward to an opened position.

With reference to FIGS. 5 and 7, the side window 3 may be moved downward to an opened state, and simultaneously, the sunshade cloth 13 may be wound into the housing 11. When the side window 3 is moved gradually downward, it will contact and press the swing arm roller 263, and the swing arm 261 is moved to pivot about the pivot pin 262 in the direction 43. The pusher 24 is pushed by the swing arm 261 to move in the direction 44, and the return spring 25 is compressed to store a return force. Simultaneously, the second ratchet wheel 232 is moved away from the first ratchet wheel 231 so that the clutch unit 23 is shifted to the non-clutching position. At this time, the retarding force that prevents the movement of the gear rack 22 is released, and the stored winding force of the winding shaft 12 will wind the sunshade cloth 13 into the housing 11. The gear rack 22 is moved downward along with the pull rod 14 until the pull rod 14 is near the top opening 111.

Third Operational Mode

Figure 8:
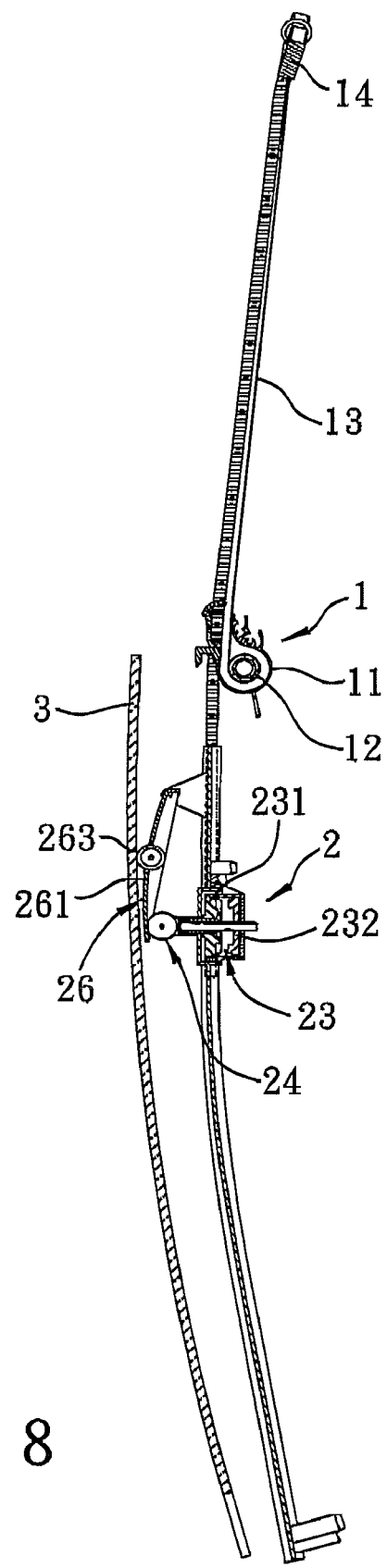
FIG. 8 is a view similar to FIG. 6, but illustrating the sunshade cloth in a stretched position while the side window is at the opened position.

With reference to FIG. 8, the side window 3 is moved downward to the opened state, and the sunshade cloth 13 can be moved to the stretched position. With reference to FIG. 5, when the side window 3 is moved downward, it presses against the swing arm roller 263, and the swing arm 261 is pivoted to push the pusher 24 away from the side window 3. The pusher 24, in turn, is moved to push the second ratchet wheel 232 away from the first ratchet wheel 231, thereby placing the clutch unit 23 in the non-clutching position. At this time, the limiting mechanism 2 has no restraining force against the sunshade mechanism 1. Thus, when the user pulls the pull rod 14 upward, the sunshade cloth 13 can be stretched, and the winding shaft 12 can store a winding force. However, once the pull rod 14 is released by the user, the sunshade cloth 13 is wound by the winding shaft 12 back into the housing 11. Hence, in this operational mode, the sunshade cloth 13 may need to be stretched completely, and/or the pull rod 14 must be hooked onto a supporting element (not shown) to maintain the sunshade cloth 13 in the stretched position.

In summary, the sunshade assembly of the present invention is provided with the limiting mechanism 2 that is mounted in proximity to the sunshade mechanism 1 and that includes the clutch unit 23. Through the clutch unit 23 that meshes with the gear rack 22, the movement of the sunshade mechanism 1 can be limited. When the clutch unit 23 is in the clutching position, through the meshing force between the first ratchet wheel 231 and the gear rack 22 and between the first and second ratchet wheels 231, 232, the sunshade cloth 13 can be pulled and stretched, and then can be stopped at any desired stretched position to suit the user's requirement for a stretching area of the sunshade cloth 13. When the clutch unit 23 is in the non-clutching position, the sunshade cloth 13 can be wound by the winding shaft 12 back into the housing 11. Hence, the present invention not only has novel structures among the elements, the effect of pulling and stopping the sunshade cloth 13 at any desired position may also be achieved, thereby facilitating the user to select a shading area according to the requirement. Use of the sunshade assembly is thus very convenient and easy. Therefore, the object of the present invention can be realized.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A sunshade assembly comprising:
   a housing having a top opening;
   a winding shaft mounted rotatably in said housing;
   a sunshade cloth wound around said winding shaft;
   a pull rod connected to one end of said sunshade cloth that is distal from said winding shaft and disposed outside said top opening;
   a frame body disposed below said housing and extending in a top-bottom direction;
   a gear rack mounted to said frame body to move upward or downward, and having a top end connected to said pull rod; and
   a clutch unit mounted to said frame body and meshing with said gear rack, said clutch unit including a pusher mounted movably to said frame body, and a return spring disposed on said frame body to return said pusher, said pusher being operable to place said clutch unit in a clutching position or a non-clutching position;
   wherein, when said clutch unit is in the non-clutching position, said gear rack is freely movable to permit said sunshade cloth to be wound by said winding shaft; and
   wherein, when said clutch unit is in the clutching position, said clutch unit applies a retarding force to retard a movement of said gear rack, which prevents said winding shaft from winding said sunshade cloth but permits said pull rod to pull and stop said sunshade cloth at a desired position.

2. The sunshade assembly of claim 1, wherein said clutch unit further includes a first ratchet wheel mounted rotatably on said frame body and meshing with said gear rack, and a second ratchet wheel that is mounted coaxially with said first ratchet wheel and that is movable axially toward or away from said first ratchet wheel by said pusher, said gear rack having a plurality of spaced apart rack teeth arranged in a top-bottom direction, said first ratchet wheel having a plurality of circumferentially spaced-apart axial gear teeth to mesh with said rack teeth, and a plurality of angularly spaced-apart first radial ratchet teeth formed on a radial surface of said first ratchet wheel, said second ratchet wheel having a plurality of angularly spaced-apart second radial ratchet teeth formed on a radial surface of said second ratchet wheel, said second radial ratchet teeth being meshed with said first radial ratchet teeth when said second ratchet wheel is moved toward said first ratchet wheel by said pusher.

3. The sunshade assembly of claim 2, further comprising a swing unit mounted pivotally on said frame body in contact with said pusher to operate said pusher.

4. The sunshade assembly of claim 3, wherein said pusher has a push rod inserted movably into said frame body to act as a journal for said first and second ratchet wheels, and a push rod roller disposed at one end of said push rod to be operated by said swing unit, said first ratchet wheel being rotatable about said push rod, said second ratchet wheel being fixed to and moved by said push, rod.

5. The sunshade assembly of claim 4, wherein said swing unit includes a swing arm mounted pivotally on said frame body, and a swing arm roller mounted rotatably on said swing arm, said push rod roller being in rollable contact with said swing arm.

6. The sunshade assembly of claim 2, wherein said frame body includes a circular receiving portion, and a guide rail portion extending in a top-bottom direction and communicating spatially with said circular receiving portion, said first ratchet wheel being mounted within said circular receiving portion, said gear rack being disposed in and movable upward or downward on said guide rail portion.

* * * * *